DOOR

Original Filed Dec. 10, 1963 4 Sheets-Sheet 1

INVENTORS.
THOMAS C. SODDY &
THEODORE Z. HERR
BY
Fay & Fay
ATTORNEYS

DOOR

Original Filed Dec. 10, 1963 4 Sheets-Sheet 2

INVENTORS.
THOMAS C. SODDY &
THEODORE Z. HERR
BY
Fay & Fay
ATTORNEYS

DOOR

Original Filed Dec. 10, 1963 4 Sheets-Sheet 3

INVENTORS.
THOMAS C. SODDY &
THEODORE Z. HERR
BY
Fay & Fay
ATTORNEYS

INVENTORS.
THOMAS C. SODDY &
THEODORE Z. HERR
BY
Fay & Fay
ATTORNEYS

United States Patent Office

Re. 27,029
Reissued Jan. 12, 1971

27,029
DOOR

Thomas C. Soddy, Downers Grove, and Theodore Z. Herr, Highland Park, Ill., by Youngstown Steel Door Co., Cleveland, Ohio, a corporation of Ohio, assignee Original No. 3,341,972, dated Sept. 19, 1967, Ser. No. 528,678, Jan. 4, 1966, which is a division of Ser. No. 329,434, Dec. 10, 1963. Application for reissue Apr. 3, 1968, Ser. No. 771,680

Int. Cl. E05d *15/10*

U.S. Cl. 49—220 4 Claims

Matter enclosed in heavy brackets [ ] appears in the original patent but forms no part of this reissue specification; matter printed in italics indicates the additions made by reissue.

*ABSTRACT OF THE DISCLOSURE*

*A plug type door for a railroad car having handle means to rotate a pair of vertical pipes with cranks secured on their upper and lower ends to open and close the door. Each of the cranks extend transversely from the longitudinal axis of the pipe to which it is secured such that the longitudinal axis of the pipe and the longitudinal axis of the crank define a plane substantially perpendicular to the plane of the door when the door is in the closed position to minimize door kick-back or flying handles when lading or gasket compression exerts a high internal load against the door and to hold the door more rigidly in closed condition against deflection under the load force.*

This application is a continuation of our co-pending application Ser. No. 329,434 filed Dec. 10, 1963, now abandoned.

This invention relates to an improved design of a plug door and, more specifically, a single sheath plug door adapted for use in a box car adapted for grain handling.

The transportation of grain in box cars has been accomplished heretofore in a car which included a conventional sliding door, with the door serving merely to cover the door opening in the wall of the car. To restrain the grain in the car and prevent leakage of the grain from behind the door, it has been necessary to provide separate grain doors in each door opening in the car. These grain doors ordinarily have taken the form of boards secured to the interior of the box car and extending across the door opening. Once each of the door openings has been boarded up to a certain level, the car has been filled with grain and the sliding door then positioned over the door opening to cover the grain door. In unloading the grain from the car, it has been necessary first to spot the car, then open the sliding door, and finally remove the grain door. The removal of the grain door ordinarily involves breaking through the boards constituting the grain door.

Such a procedure has had several drawbacks. Among these have been the cost of installing grain doors and removing them when it is desired to unload the grain, as well as the cost of materials in providing a grain door with each load of grain in a box car. Additionally, there has been the contamination of the grain due to the less than perfect sealing of the grain door as well as the presence of broken cooperage in the grain after breaking through the grain door.

In its most specific aspect, it is an object of this invention to eliminate the above-enumerated problems which are present in grain handling.

More broadly, it is an object of this invention to provide a door which is usable with a box car wherein the lading exerts very high internal loads against the door and provision must be made in the door mechanism to resist these internal loads.

It is another object of this invention to provide a plug door having a door operating mechanism capable of withstanding high internal loads without permitting deflection in the door and disrupting the proper seal around the periphery of the door.

It is another object of this invention to provide a door which is single sheath in construction, with the single sheath being flush with the interior wall of the railroad box car.

Still another object of this invention is to provide a plug door adapted to be used in a box car for grain handling and having grain loading and inspection doors in combination therewith.

Another object of this invention is to provide a single sheath plug door having loading and inspection doors.

A more specific object of this invention is to provide a single sheath plug door which is mounted on cranks for lateral movement inward and outwardly of the door opening in the box car wall, and wherein the cranks for effecting the lateral movement of the door [are substantially normal] *are attached to pipes secured to the car door in such a manner that the longitudinal axis of each of the pipes and the longitudinal axis of the cranks attached thereto define a plane perpendicular* to the plane of the door when the door is in the closed position.

Another specific object of this invention is to provide a plug door supported on rotatable cranks for lateral movement into and out of the door opening and having locking fingers in combination therewith, with the locking fingers being operated by the means for rotating the cranks.

Another specific object of this invention is to provide a system of cranks mounting a plug door for lateral movement on a railroad car, with the cranks being oriented such that flying levers or kickback of the door is *substantially* eliminated.

Each of these objects, as well as others which will become more apparent upon a complete reading of the following description, is accomplished by the provision of a plug door mounted for rolling movement on tracks on a railroad box car. The door is supported for lateral movement into and out of the door opening in the wall of the car by a system of rotatable cranks. The rotatable cranks are designed for rotation by mutually operable levers which are readily accessible from the exterior of the door. In conjunction with the rotatable cranks are a plurality of locking fingers which are associated with the cranks such that, upon operation of the manually operable levers, the fingers will be extended or withdrawn from engagement with the door posts framing the opening in the railroad car. In combination with the plug door there also is included inwardly opening grain access doors which are formed in the upper section of the door and which are adapted to provide a means for the loading and inspection of the contents of the car. The crank mechanism which effects the lateral movement of the door is designed such that, with the door in the closed position, [the cranks are substantially normal] *the longitudinal axis of each of the pipes and longitudinal axis of the cranks attached thereto define a plane perpendicular* to the plane of the door thereby eliminating the need for upper and lower locks and greatly enhancing the rigidity of the door. Moreover, in the closing movements of the door as the [cranks approach a normal position] *longitudinal axes of the cranks and pipes approach the perpendicular plane* relative to the door, the mechanical advantage available for compressing the gasket normally present on a plug door is greatly enhanced.

Through utilization of the principles of this invention, it has been possible to reduce substantially the cost of the door inasmuch as expensive fittings of various prior designs are not required. Moreover, the total weight of the door is greatly reduced thereby permitting a higher possible pay load per railroad car. Additionally, these features have been accomplished without a sacrifice in the rigidity of the door or its sealing characteristics. In fact, the latter feature has been greatly enhanced along with the safety and economy of operation of the door operating mechanism.

It is to be noted and emphasized that, although the following description is primarily directed to the grain handling environment, the principles of the invention are not limited to this specific application. In fact, the plug door and the principles of the invention incorporated therein may be utilized in any environment where the lading exerts a high internal load against the door and the handling of grain is but one of the many applications wherein the principles of this invention may be used to advantage. Therefore, to the accomplishment of the foregoing and related ends set forth above, the following description sets forth in detail but one approved basic means of carrying out the invention; such disclosed means are not meant to be limiting, constituting but one of the various ways in which the principles of the invention may be applied.

In the drawings wherein like reference numerals indicate like parts in the various views.

Figure 1:
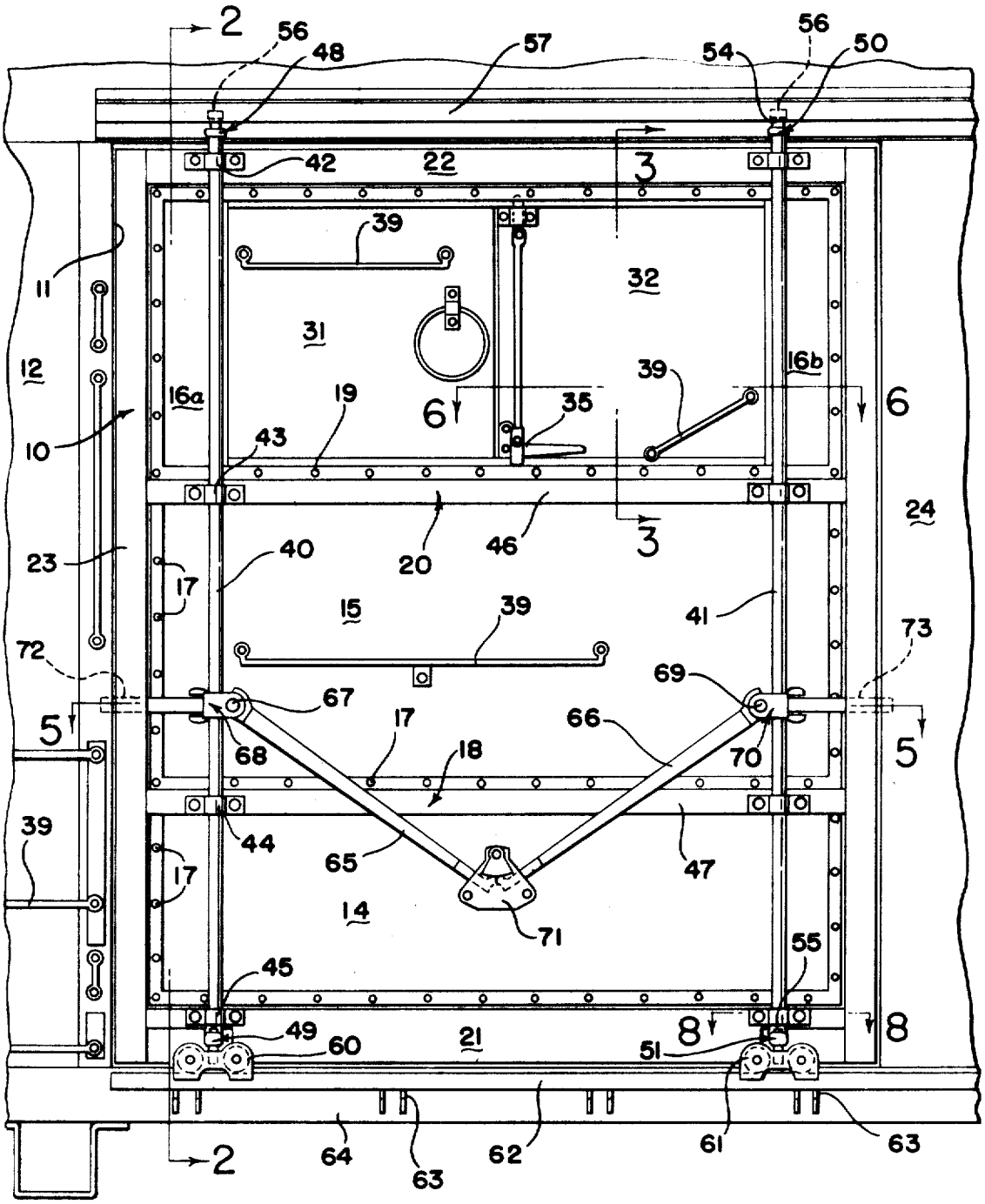
FIG. 1 is a front elevational view showing the invention as it is incorporated in a railroad car door.

Referring to the drawings which illustrate one preferred embodiment of the invention, the numeral 10 indicates a plug door which is received in an opening 11 formed in the wall 12 of a conventional railroad box car. The car may be of a single sheath, double sheath, or insulated construction, but would, in any event, have an internal sheathing 13 which would form a smooth interior wall for the car.

The door 10 received in the opening 11 is of a single sheath construction. That is, a single sheath, preferably steel, provides the sole means for covering the door opening as opposed to the double sheath construction wherein two sheaths of material are separated by wooden posts or the like. The single sheath door 10 comprises steel panels 14, 15, 16a and 16b vertically arranged one above the other. The adjacent longitudinal edges of the panels 14, 15 are interconnected by rivets 17 with a reinforcing bracket or framing member 18 also secured to the overlapping edges of the two panels. A similar construction is provided between the adjacent edges of the panels 16a, 16b, and 15 wherein rivets 19 secure the adjacent edges of the panels and a reinforcing bracket or framing member 20 which is similar to the bracket or framing member 18. Reinforcing channel members 21, 22 frame the upper and lower edges of the door 10 and are secured by rivets to the respective edges of the upper and lower panels 16, 14 respectively. Side framing channel members 23, 24 complete the door structure and are secured by rivets to the aligned vertical edges of the panels 14, 15 and 16. Each of the side framing members 23, 24 and the upper and lower framing members 21, 22 is provided with a sealing gasket 26, with the gasket serving to seal the peripheral edges of the door in the door opening when the door is properly oriented.

Figure 2:
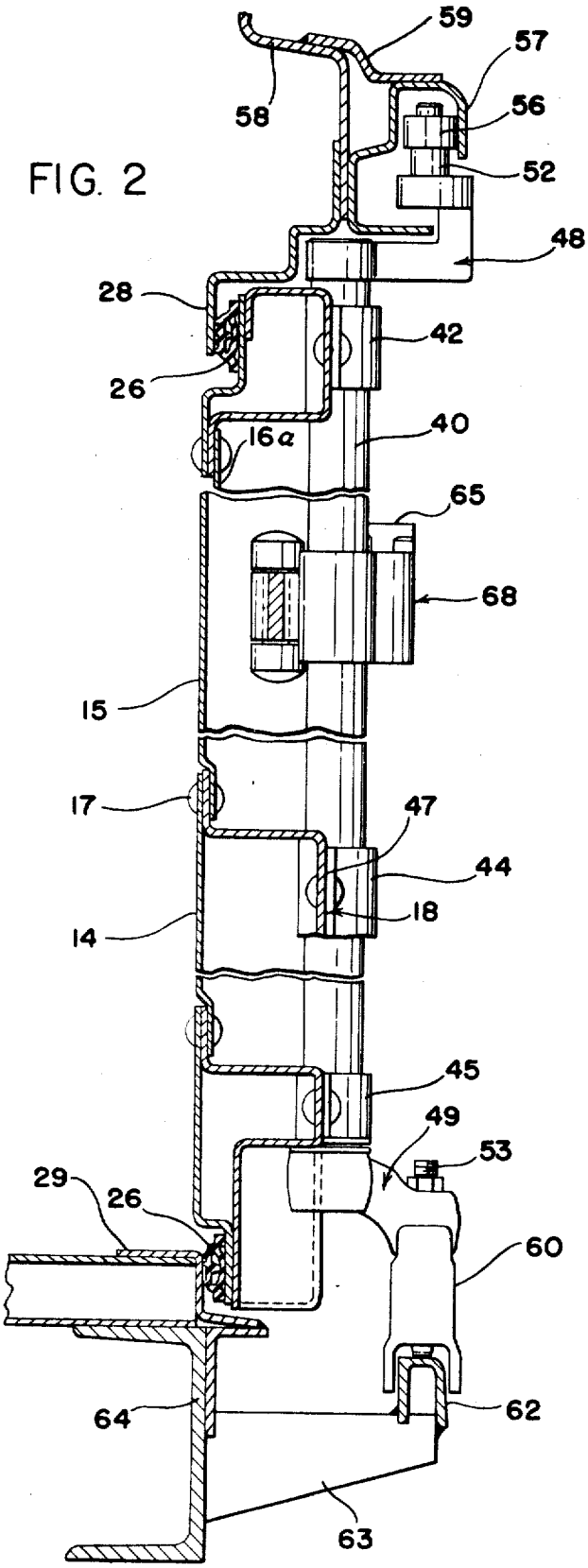
FIG. 2 is a side elevational view taken along line 2–2 of FIG. 1
Figure 3:
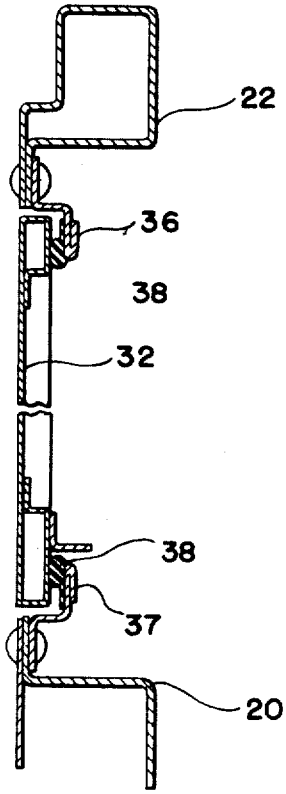
FIG. 3 is a view taken along line 3–3 of FIG. 1.
Figure 4:
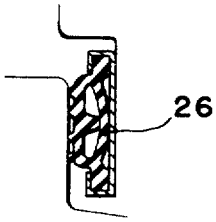
FIG. 4 is an enlarged view of a typical gasket and edge construction which may be used in the application of this invention.
Figure 5:
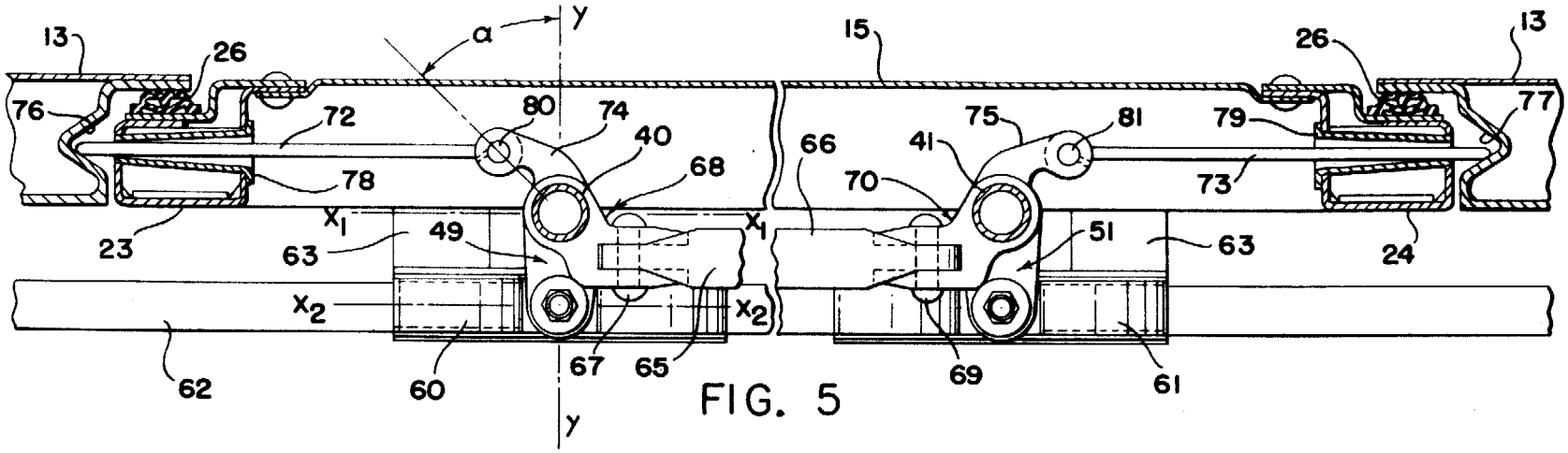
FIG. 5 is a sectional view taken along line 5–5 of FIG. 1.
Figure 6:
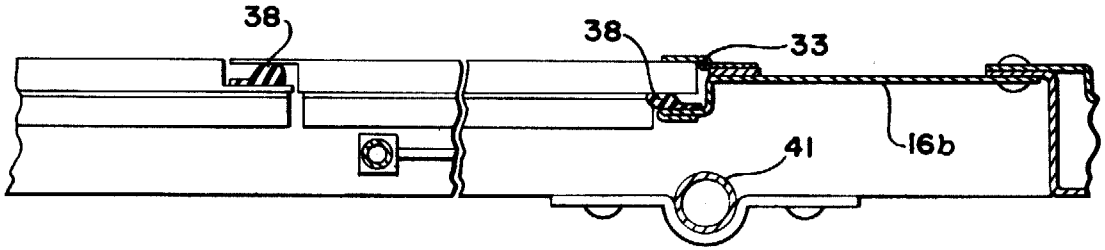
FIG. 6 is a partial section taken along line 6–6 of FIG. 1 and illustrates the mounting of the access doors.
Figure 8:
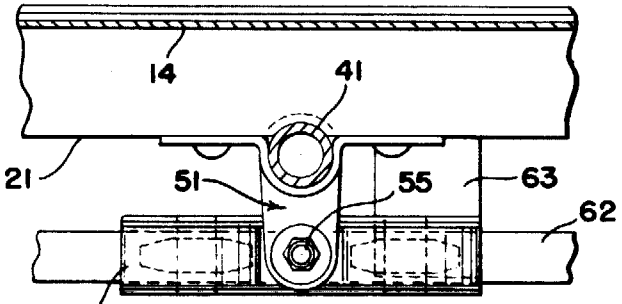
FIG. 8 is a section taken along line 8–8 of FIG. 1.
Figure 7:
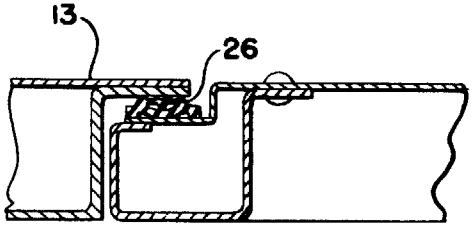
FIG. 7 is a modification of the gasket and door edge construction shown in FIG. 4.
Figure 9:
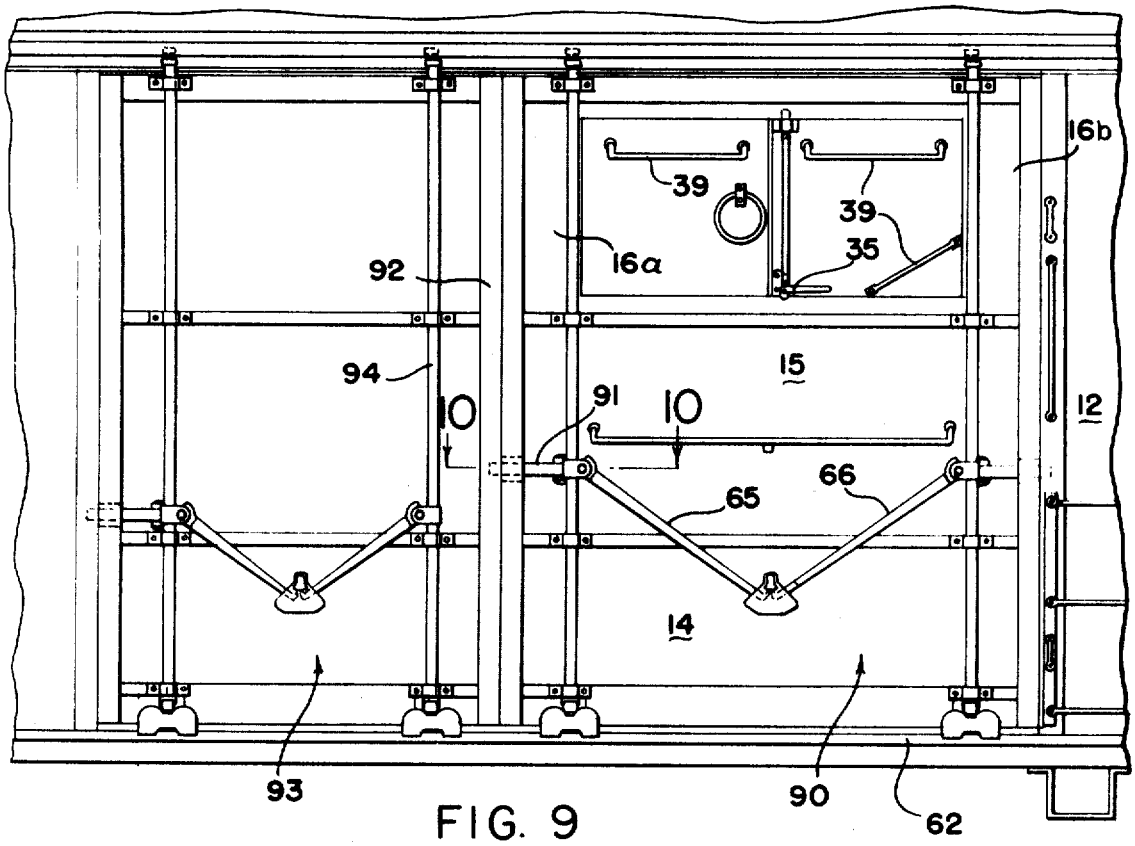
FIG. 9 is a front elevational view of the invention as it is incorporated in a double plug door enviornment.

Referring to FIGS. 2 and 5, it is to be noted that the sheaths 14, 15, 16, and their associated reinforcing framing members and gaskets project inwardly to a point wherein they lie in the same general plane as the interior wall 13 of the railroad car. Similarly, the door sheaths also are in the vertical plane of the upper and lower door headers 28, 29. With such an arrangement, it is obvious that when the door is in the fully closed position, with the gaskets 26 in sealing engagement, as shown in FIGS. 2 and 5, the door 10 is substantially flush with the interior wall of the car thus providing a generally planer interior surface. As a consequence, the lading in the car, such as grain, will exert a force against the door in a manner substantially identical to the force exerted against the side walls of the box car.

The provision of a plug door which is flush with the interior of the railroad car eliminates the need for building a separate grain door as was the case when a simple sliding door was utilized. However, in order to provide access to the interior of the car during the loading operation as well as inspection of the contents of the car, there are provided access doors 31, 32 secured to the panel members 16a, 16b. Each of the doors 31, 32 are hinged to their respective panels by hinges 33 whereby the doors may be swung inwardly into the railroad car. The grain door 32 overlaps the adjacent edge of the grain door 31 so that with the grain door 32 latched in position by a latching device 35, the door 31 is restrained from any inward movement. Outward swinging movement of the grain doors 31, 32 is restrained by upper and lower door headers 36, 37 supported by the bracket member 20 and the upper framing member 22. Gaskets 38 carried by the headers 36, 37 and the sheaths 16a and 16b serve to seal the access doors. To facilitate the utilization of the grain doors, appropriate steps and hand holds 39 are provided on the side of the railroad car an the door itself.

To accomplish the removal of the door 10 from the door opening, there is provided a pair of vertically extending pipes 40, 41. The pipes 40, 41 are secured by fulcrums 42, 43, 44, 45 to the door 10. The fulcrums 43, 44 are secured to the depending legs 46, 47 of the bracket or framing members 20, 18 respectively. In similar fashion, the fulcrums 42, 45 are secured to the upper and lower framing members 22, 21.

Attached to the upper and lower extremities of the pipe [s] 40 [41,] *and extending transversely therefrom* are upper and lower cranks 48, 49. Similar cranks 50, 51 are secured to *and extend transversely from* the upper and lower extremities of the pipe 41. The cranks 48, 49 on the pipe 40 include spindles 52, 53. Similar spindles 54, 55 are carried by the cranks 50, 51 on the pipe 41. The upper spindles 52, 54 support rollers 56 which are received behind a longitudinally extending retainer plate 57 at the upper edge of the door opening. The retainer plate 57 is secured to the side plate 58 of the car with a top reinforcement plate 59 aiding in the securement of the retainer 57 to the plate. The rollers 56 serve to retain and guide the door upon the car as the door is moved longitudinally of the railroad car.

The lower spindles 53, 55 are secured to roller carriages 60, 61 with the roller carriages being mounted on a track 62 which extends longitudinally of the car side. The track is supported on the car by brackets 63 which are secured to the sill structure 64.

The combination of the rollers 56 and the carriages 60, 61 provide a means whereby the door 10 may be displaced longitudinally of the railroad car thereby to expose the door opening 11. However, before longitudinal movement of the door may be effected, it is necessary to move the door laterally of the railroad car thereby to remove the door 10 from the opening 11. Such lateral movement of the door is effected by rotation of the pipes 40, 41 thereby imparting a rotation to the cranks 48, 49, 50, 51 and thus withdrawing the door from the opening in a manner well known in the plug door art.

Rotation of the pipes 40, 41 is controlled by manually operable levers or handles 65, 66. The lever 65 is pivotally secured to the pipe 40 by a pin 67 and a clevis 68. A similar pin 69 and clevis 70 are used to connect the lever 66 with the pipe 41. It is apparent that by the pins 67, 69, it is possible for the levers 65, 66 to be pivoted in a plane parallel to the plane of the door 10 without imparting rotation to the pipes. However, upon rotation of the handles 65, 66 in a plane generally normal to the plane of the door 10, rotation will be imparted to the pipes 40, 41 and their respective cranks. A keeper 71 is provided on the panel 14 and it is adapted to receive the ends of the lever 65, 66 thereby to maintain them in an inoperative position when the door is not being operated.

The particular door herein illustrated is designed so that the framing members, panels and fixtures will satisfactorily withstand a maximum lading loading exerted against the door from within the car. However, several problems are inherent in a plug door which is designed to withstand the high internal loads exerted by the lading. Thus, it is necessary to design the door so that a minimum deflection of the door occurs thereby to insure the proper seal around the periphery of the door. Obviously, distortion of the door would destroy this sealing relationship. Moreover, the sealing gaskets used to seal the door opening are of necessity, of a substantially rigid construction and a considerable amount of effort is required to compress these gaskets when the door is being closed. Finally, there is also the problem of the lading exerting a force against the interior of the door as the door is being opened and the possibility that the handles 65, 66 will act in the nature of flying levers as the door kicks back due to the high interior loading.

To remedy these problems, a novel arrangement of the door operating mechanism has been provided. Thus, turning to FIGS. 1, 2, 5 and 9, it is to be noted that the *longitudinal axis of each of the* cranks 48, 49, 50, 51 [are disposed substantially normal] *and the longitudinal axis of each of the pipes 40 and 41 attached thereto define a plane perpendicular* to the plane of the door when the door is in the closed position. Several advantages are derived from this relationship between the cranks, *pipes* and the door. The perpendicular *plane* arrangement of the cranks *and pipes to which they are attached* as illustrated in FIG. 1 serves to withstand the interior forces exerted by the lading to a greater extent than the cranks as they were oriented heretofore. Thus, the rollers 56 carried by the cranks 48, 50 abut the retaining member 57 and the cranks 49, 51 are interposed between the carriages 60, 61 and the door thus providing a rigid linkage acting in direct opposition to the lading forces. Contrasted with this is the arrangement heretofore known wherein the cranks were subtsantially parallel to the plane of the door when the door was closed and therefore offered slight resistance to internal pressures. In fact, the parallel nature of the cranks provided a convenient lever arm through which the interior forces could act to rotate the pipes and open the door. To prevent this result, special locking devices were used to restrain the upper and lower edges of the door. The present design has eliminated the need for additional locks along the upper and lower edges.

An additional feature resulting from the design is the ease with which the gaskets are compressed as the closure of the door is effected. As the door is being laterally displaced into the opening and the closure is near completion, the gasket 26 engages the members framing the door openings. At this point and as the gasket compression commences, the cranks 48, 49, 50 51 *and pipes 40 and 41* are nearly in a normal *planar* relationship to the plane of the door. In this position, it is apparent that a high mechanical advantage is obtained and it takes relatively small force acting on the ends of the handles 65, 66 to complete the rotation of the cranks and compress the sealing gasket. With the door fully seated in the opening and the gaskets compressed, the cranks are in the perpendicular *plane* relationship described above and serve to retain the upper and lower edges of the door in a fully closed and sealed position.

To aid in locking the side edgs of the door in the door opening, there are provided additional locking members which are operated simultaneously with the rotation of the pipes 40, 41. These locking members take the form of locking fingers 72, 73. As viewed in FIG. 5, the locking finger 72 is secured at one end to an extension or arm 74 of the clevis 68 associated with the pipe 40. Similarly, the finger 73 is secured to an extension or arm 75 of the clevis 70. It is believed apparent that, upon rotation of the clevises 68, 70, a corresponding pivoting action of the arms 74, 75 about the pipes 40, 41 respectively is effected. The pivoting movements of the arms 74, 75 serve to extend or withdraw the fingers 72, 73 from keeper recesses 76, 77 formed in the side wall of the car. To control the movements of the fingers 72, 73 through the side framing members 23, 24, there are provided guide members 78, 79 which extend through the side framing members. The guide members 78, 79 are of a generally conical configuration to accommodate the pivoting action of the fingers 72, 73 about their respective pins 80, 81.

It is important to note the angular relationship between the cranks 48, 59, 50, 51 and the arms 74, 75. In this regard, attention is directed to FIG. 5 wherein this angular relationship is illustrated and it is to be noted that in the closed position of the door, the arms 74, 75 are displaced at an angle of approximately 45° from alignment with the perpendicular *planes of the* cranks[.] *and pipes.* This angle is denominated "a" in FIG. 5. It is obvious that to withdraw the fingers 72, 73 from the engagement with their respective keepers 76, 77, it is necessary to effect a longitudinal movement of the fingers. Assuming a circle about the pipes 40 as the center and with the arms 74, 75 disposed in the quadrant illustrated in FIG. 5, rotation imparted to the pipes 40, 41 will impart a primarily longitudinal movement to the fingers 72, 73. This movement along the $X_1$—$X_1$ axis increases as the arms approach alignment with the Y—Y axis. There will be a slight transverse movement also imparted to the fingers; however, this is provided for by the conical configuration of the guide members 78, 79 and the pivot pins 80, 81.

Contrasted with the angular orientation of the arms 74, 75 is the orientation of the cranks 48, 49, 50, 51. To withdraw the door from the opening 11, it is necessary for the door to effect a lateral or transverse movement, as distinguished from the longitudinal movement required for the withdrawal of the locking fingers 72, 73. Moreover, it is necessary that the lateral movement of the door be effected after the longitudinal movement of the fingers has released the door. Therefoer, it is believed apparent that from a single rotation of the pipes 40, 41 is it necessary to accomplish a compound sequential movement of the arms 74, 75, fingers 72, 73 and the cranks. The angular relationship of the arms and cranks accomplishes this purpose.

From an inspection of FIG. 5, it is to be seen that rotation of the pipes 40, 41 will cause the cranks 48, 49, 50, 51 to rotate about the longitudinal axis of the pipes as a center. The cranks, as distinguished from the arms 74, 75 however, are aligned with the co-ordinate axis Y—Y and therefore, although being in an adjacent quadrant to the arms 74, 75, the cranks are in a different angular position and are, in effect, 45° out of phase with the arms 74, 75. Thus, whereas rotation of the arms 74, 75 effected an increasingly major movement along the $X_1$—$X_1$ axis and a decreasing minor movement along the Y—Y axis to effect the longitudinal withdrawal of the fingers, a similar angular displacement of the cranks will effect a similar but reverse movement of the pipe 40, 41 along the co-ordinates illustrated in FIG. 5. Thus, as the pipes are rotated, the cranks will be rotated with the pipes. Inasmuch as the door is restrained from lateral movement, the rotation of the pipes will effect a sliding movement of the carriages 60, 61 along the track and, in effect, along the axis $X_2$—$X_2$, parallel to axis $X_1$—$X_1$. As the carriages slide along the tracks, the cranks will assume an angular relationship with the cor-ordinate axis Y—Y and effect a withdrawal of the pipes along this co-ordinate. It is to be noted that the major co-ordinate movements of the crank initially are along the $X_2$—$X_2$ axis and only a minor withdrawal of the pipes along the Y—Y axis is effected.

The net effect of this angular relationship between the arms and the cranks is that rotation of the pipes 40, 41 will effect a reversal of the positions of the arms and cranks. Thus, the arms will tend to assume a position of alignment along the Y—Y axis while the cranks assume an angular relationship of 45° relative to the Y—Y axis. With these movements occurring in adjacent quadrants about the pipes as a center, it is believed apparent that the respective movements of the arms and cranks compliment each other so as to produce a smooth operation of the door. That is, there is a rapid withdrawal of the fingers 72, 73 during the initial rotation of the pipes and, concurrent with this withdrawal, there is a slight withdrawal of the door 10 from the door opening. However, continued rotation of the pipes reverses this action so that, as the fingers are withdrawn from their keepers, the withdrawal of the door from the opening is accelerated.

To compensate for the initial minor component of movement of the door along the Y—Y axis as the pipe is rotated, the keepers 76, 77 are provided with sloping sides so that wedging of the fingers in the keepers is prevented. A similar arrangement might be made by bevelling the ends of the locking fingers.

An additional advantage is derived from the angular *and planar* relationship of the cranks *and pipes* relative to the door. As pointed out above, the forces exerted against the interior surface of the door by the lading in the car, particularly when the lading comprises such commodities as grain, is of a signficant value. There is a tendency, as a consequence of this interior force, for the levers to be dangerous to the operator since the force acting on the interior of the door may accelerate the rotation of the pipes and, in effect, produce a "flying lever." The major force which prevents such an occurrence is the frictional forces restraining the sliding movement of the carriages 60, 61 on the track 62. The frictional force retarding the free sliding movement of the carriages along the track is determined by multiplying the coefficient of friction times the normal force acting on the carriage. With the cranks normal to the plane of the door and the track, the normal force acting on the carriages will be substantially equal to the interior force exerted by the lading. As the cranks are rotated, the normal force acting on the carriage becomes a function of the angular relationship between the cranks and the carriage so that as the cranks assume a larger angle relative to the carriage, the normal force will decrease and, therefore, the force retarding free sliding movement of the carriages will decrease. However, it has been found that by providing the cranks at a perpendicular relationship to the track during the initial operation of the door mechanism, the normal force available through a range of angles of the cranks is adequate to permit the withdrawal of the locking fingers and initial withdrawal of the door before the interior forces acting on the door overcome the frictional force exerted by the carriage. Of course, as the door is withdrawn from the opening, the interior forces exerted by the lading are dissipated so that, at the time the angle assumed by the cranks has become sufficiently large, the forces acting on the door have decreased to such an extent that there is no problem of the door kicking back or a flying lever.

Recapitulating the operation of the door as described above and assuming the door to be in the position shown in FIG. 5, an operator would release the handles 65, 66 from the retainer 71 and rotate the handles in a plane generally normal to the plane of the door. Such rotation of the handles would impart a corresponding rotation to the pipes 40, 41 and effect a withdrawal of the locking fingers 72, 73 from their respective keepers. As pointed out previously, the withdrawal of the locking fingers is relatively rapid due to the angular position of the arms 74, 75 in a quadrant of a circle described about the pipes. Simultaneous with the withdrawal of the locking fingers is the rotation of the cranks about the pipes as axes. This latter rotation causes an initial slow withdrawal of the door from the door opening, with such slow movement being of a duration approximately equal to the angular movement of the pipe required to withdraw the locking fingers from their keepers. With the locking fingers substantially removed from their locking position, the withdrawal movement of the door is accelerated until the door is completely clear of the door opening. With the door in the laterally withdrawn position, it is capable of being displaced longitudinally along the side of the railroad car thereby to expose the door opening for unloading the railroad car.

With the car unloaded, it is a simple reverse operation of the above-described procedure to spot the door in the door opening and rotate the pipes 40, 41 in reverse direction so that the door is first rapidly replaced in the door opening and with the final degrees of pipe rotation being effective to extend the locking fingers 72, 73 into their respective keepers and compress the sealing gasket. With the door locked in position, the car is ready for additional use and only the access doors 31, 32 need be opened for refilling of the car.

With the above principles in mind, it is believed apparent that the objects set forth have been fully accomplished. Thus, there is provided a strong, yet lightweight, single sheath door construction, with the inner surface of the door being flush with the interior walls of the railroad car. Such a construction eliminates the need for the grain door heretofore required. In conjunction with the door, there has been provided a means in the form of access doors whereby a novel technique of grain handling may be effected. Finally, a greatly simplified door operating and locking mechanism has been provided, with the door operating mechanism eliminating the problems of door kickback and flying levers.

Figure 10:
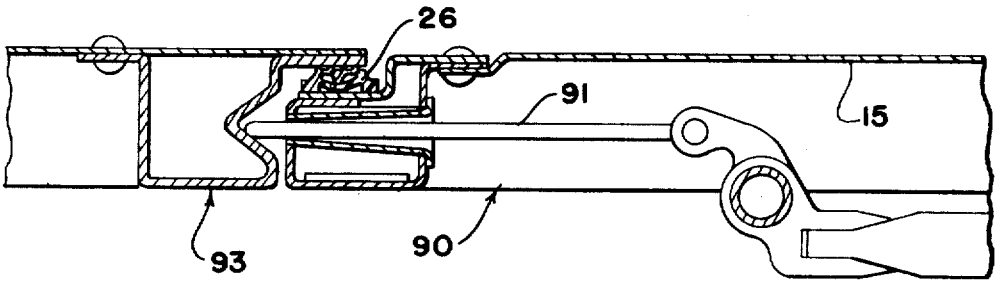
FIG. 10 is an enlarged view of the locking finger mechanism of FIG. 9. and taken along line 10–10 of FIG. 9.

It is to be emphasized that, although the disclosure has been in terms of transporting grain, the principles of this invention are not to be limited to such an environment. Rather, the principles of the invention are believed to be equally applicable to any environment wherein a plug door may be utilized. Thus, modification of the environment in which the principles of this invention may be used is illustrated in FIG. 10 wherein a double plug door is illustrated. The door 90 is generally of the same construction as that illustrated in FIG. 1. The locking finger 91 on the door 90 engages a keeper in the edge 92 of the auxiliary door 93. The auxiliary door 93 likewise is generally of the design as that shown in FIG. 1, with the exception of the locking mechanism associated with the pipe 94. To permit the opening of the main door 90 while retaining the auxiliary door 93 in closed position, it is necessary that the lock associated with the pipe 94 be of a modified construction and that it not engage the edge of the main door 90. Any appropriate device may be used to accomplish this purpose and no particular configuration is believed necessary for the purpose of this disclosure.

Additional modifications and changes will suggest themselves to those having ordinary skill in the art. Thus, it is apparent that the number of locking fingers associated with each of the pipes is not critical and more than one locking finger per pipe may be utilized. Moreover, the door operating mechanism disclosed herein is not limited to a single sheath plug door and is equally applicable to a plug door which is of a double sheath construction. Changes such as these, to enumerate a few, are contemplated by the principles of this invention so that, although for ease of description, the principles of the invention have been set forth in connection with but a single illustrated embodiment, it is not intended that the illustrated embodiment or the terminology employed in describing it is to be limiting.

What is claimed is:

1. In a railroad car having a side wall with means defining an opening [formed] therein;

a door adapted to [be] *engage the means defining an opening therein* received in the opening *with a gasket under compression therebetween;*

*said door comprising a plurality of single sheath members which are mounted on upper, lower and side framing members in substantially the same plane as the adjacent portion of the side wall when the door is in closed condition;* operating means secured to said door and adapted to support said door on said car for lateral movement into and out of the door opening;

said operating means including a pair of vertical pipes rotatably mounted on said door;

crank means secured to the upper and lower ends of each of said pipes for rotation with said pipes;

each of said crank means [being substantially perpendicular to the longitudinal axis of said pipes] *extending transversely from the longitudinal axis of the pipe to which it is secured;* roller means connected to each of said crank means;

track means on said car;

said roller means being in engagement with said track means and supporting said door for rolling movement longitudinally of the car;

actuating means secured to said pipes for rotating said pipes and said crank means thereby to effect the lateral movement of said door;

*locking fingers slidably supported on said door;*

*said locking fingers being adapted to be reciprocatea through said side framing members into and out of locking engagement with the vertical edges of the means defining the door opening;*

*means interconnecting said locking fingers with said pipes and actuating means whereby upon rotation of said pipes sliding movement is imparted to said locking fingers;* the angular relation of *each of* said crank means to [said pipes] *the pipe to which it is secured* being such that [with the door in the closed position,] the longitudinal [axes of said crank means are disposed substantially perpendicular to the plane of said door.] *axis of the pipe and the longitudinal axis of the crank define a plane perpendicular to the plane of the door when the door is in the closed psoition.*

[2. The combination of claim 1 wherein the angular relation of said crank means to said pipes is such that when the door is in the closed position, the longitudinal axes of said crank means are disposed substantially perpendicular to the plane of said door.]

3. The combination of claim [2] 7 wherein said linkage means for each of said locking fingers includes an arm secured for rotation with one of said pipes;

means pivotally interconnecting said arm with said locking finger;

the angular relation between said arm and said crank means on said pipe being such that with the door in the closed position, initial rotation of said pipe effects a rapid withdrawal of said locking fingers from locking engagement and a corresponding relatively slow lateral withdrawal of said door from the door opening.

[4. The combination of claim 3 wherein said linkage means for each of said locking fingers includes an arm secured for rotation with one of said pipes;

means pivotally interconnecting each of said arms with one of said locking fingers;

the angular relation between said arm and said crank means on said pipe being such that with the door in the closed position initial rotation of said pipe effects a rapid withdrawal of said locking fingers from locking engagement and a corresponding relatively slow lateral withdrawal of said door from the door opening.]

5. The combination of claim [3] 7 wherein said actuating means comprises a manually operable handle secured to each of said pipes.

[6. The combination of claim 1 wherein said door comprises a plurality of aligned coplanar single sheath members;

the single sheath members of said door being in substantially the same plane as the adjacent portion of the side wall when the door is in the closed position.]

*7. In a railroad car having a side wall with an opening formed therein;*

*a door adapted to be received in the opening;*

*operating means mounted on said door adapted to support said door on said car for lateral movement into and out of the door opening;*

*said door operating means including a pair of vertical pipes rotatably supported on said door;*

*crank means secured to the upper and lower ends of each of said pipes for rotation with said pipes;*

*each of said crank means extending transversely from the longitudinal axis of the pipe to which it is secured;*

*track means supported on said car;*

*roller means connected to each of said crank means;*

*said roller means being in engagement with said track means and supporting said door for rolling movement longitudinally of the car;*

*locking fingers slidably supported on said door;*

*said locking fingers being adapted to be reciprocated into and out of locking engagement with the vertical edges of the door opening;*

*linkage means interconnecting said locking fingers with said pipes whereby upon rotation of said pipes sliding movement is imparted to said locking fingers;*

*actuating means connected to said pipes for initiating rotation of said pipes; and*

*wherein the angular relation of each of said crank means to the pipe to which it is secured is such that the longitudinal axis of the pipe and the longitudinal axis of the crank define a plane substantially perpendicular to the plane of the door when the door is in the closed position.*

References Cited

The following references, cited by the Examiner, are of record in the patented file of this patent or the original patent.

UNITED STATES PATENTS

| | | | |
|---|---|---|---|
| 1,221,971 | 4/1917 | Copony | 49—218 |
| 1,959,706 | 5/1934 | Christianson et al. | 49—218 |
| 2,062,757 | 12/1936 | Moore et al. | 49—218X |
| 2,143,226 | 1/1939 | Lonergan | 49—219X |
| 1,441,349 | 1/1923 | Henry | 20—24 |
| 2,902,122 | 9/1959 | Beauchamp | 20—22 |
| 2,975,490 | 3/1961 | Beauchamp | 20—23 |
| 3,127,963 | 4/1964 | Beauchamp. | |
| 3,179,986 | 4/1965 | Madland | 49—220 |
| 3,218,679 | 11/1965 | Soddy | 20—23 |

KENNETH DOWNEY, Primary Examiner